Oct. 1, 1935.  J. C. HENDERSON  2,016,245
LAMINATED GLASS
Filed Sept. 14, 1928  2 Sheets-Sheet 1
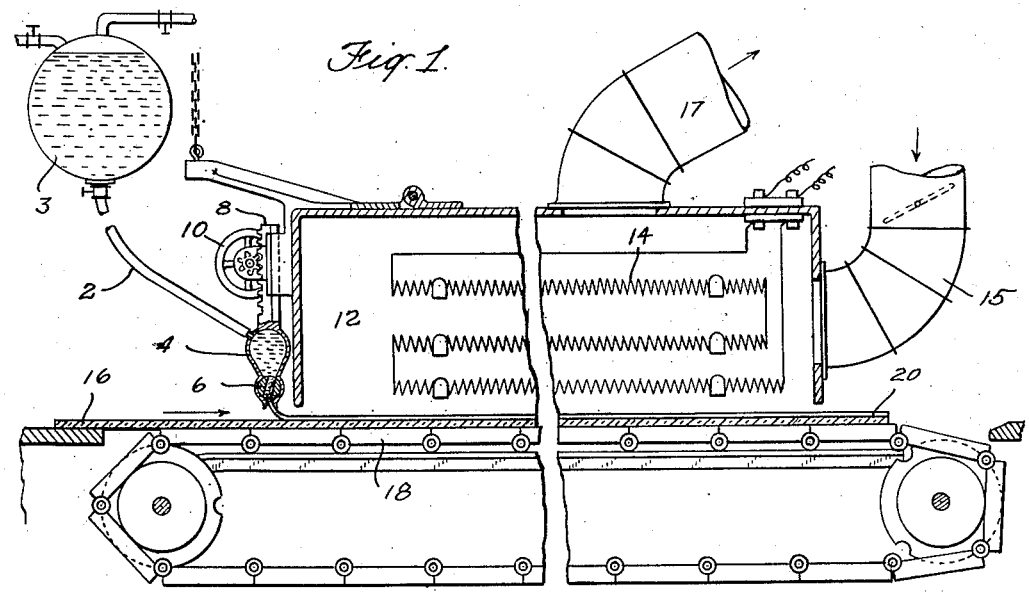
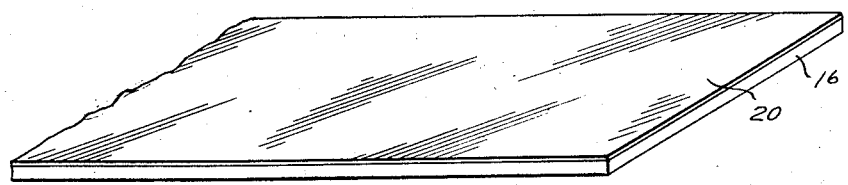
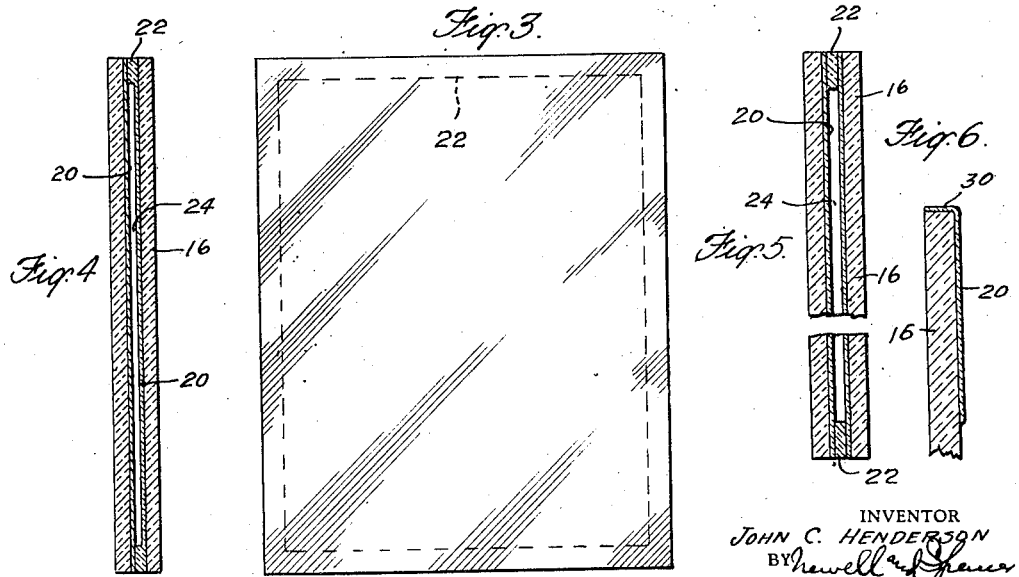
INVENTOR
JOHN C. HENDERSON
BY
ATTORNEYS Oct. 1, 1935.  J. C. HENDERSON  2,016,245
LAMINATED GLASS
Filed Sept. 14, 1928  2 Sheets-Sheet 2
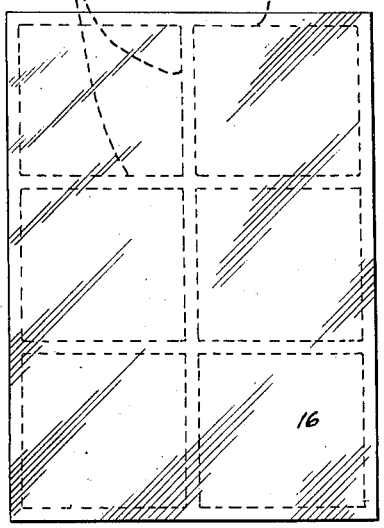
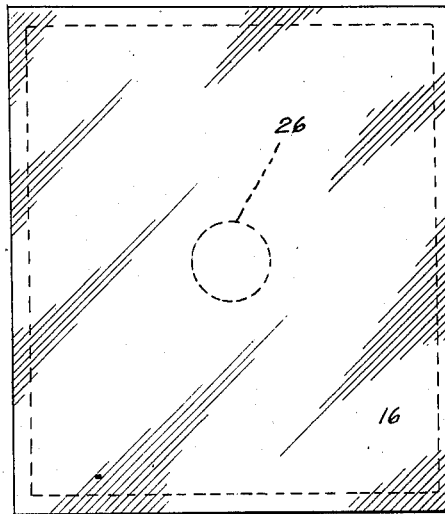
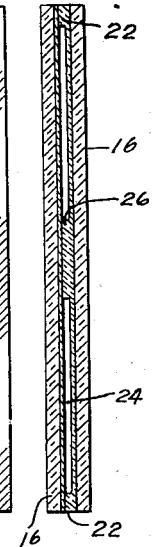
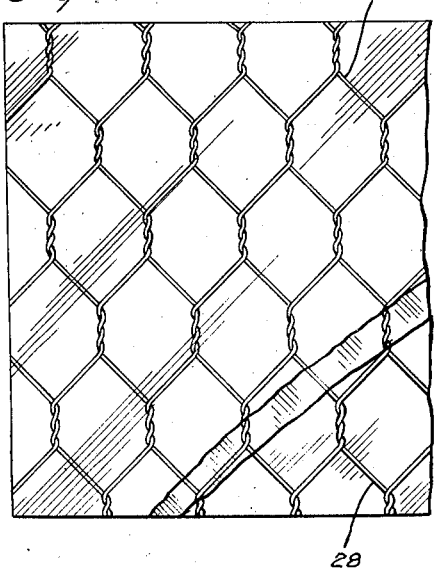
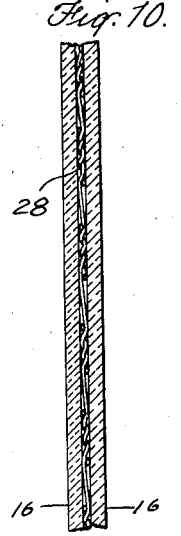
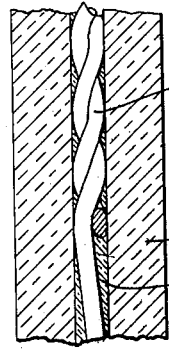
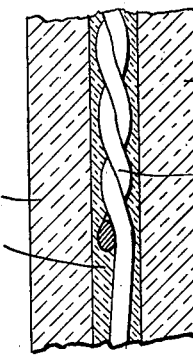
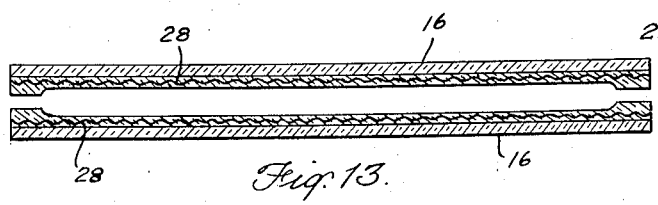
INVENTOR
JOHN C. HENDERSON
BY
ATTORNEYS Patented Oct. 1, 1935

2,016,245

UNITED STATES PATENT OFFICE 2,016,245

LAMINATED GLASS

John C. Henderson, New York, N. Y.

Application September 14, 1928, Serial No. 305,908

1 Claim. (Cl. 91—55)

This invention relates to so-called "shatter-proof" glass, that is glass having thereon a coating of some material which will prevent the fragments or splinters of glass from dropping away from the remainder of the glass when the glass is broken.

One of the most common ways of producing a shatter-proof or shatter-resisting glass is to introduce between two sheets of glass a sheet or skin of nitro-cellulose material, such as ordinary celluloid, and secure the three sheets together, the sheets being in contact throughout their contiguous faces. One of the difficulties encountered in the use of laminated glass of this character is that when the glass upon one side of the intermediate layer of cellulose material receives a blow which is sufficient to break it, the shock of the impact is transmitted directly through the intervening layer of cellulose material and usually in sufficient force to break the other sheet also.

One of the objects of the present invention is to provide shatter-proof or shatter-resisting glass, which, while having the sheet of cellulose or other protective material protected from the atmosphere and from accumulation of dust and injury from sand blasting from road dust when used for windshields, etc., is nevertheless so constructed that the tendency of the shock received by one of the sheets of glass to be transmitted to the other sheet will be substantially eliminated.

The invention aims also to provide improved means for applying the protective or shatter-resisting coating to the glass.

Other objects and important features of the invention will appear from the following description and claims when considered in connection with the accompanying drawings, in which Fig. 1 illustrates simple apparatus for applying the sheet or coating of cellulose or other non-brittle material to the glass in order to render it substantially shatter-proof;

Fig. 2 is a perspective view of a sheet of glass having a protective coating applied to it;

Fig. 3 shows a sheet of glass with a protective coating and having moulded or laid upon it adjacent to its edges a spacing frame, preferably of a material similar to the protective coating;

Fig. 4 is a sectional view through a laminated glass embodying the present invention, this figure showing the spacing frame moulded integral with one of the sheets or layers of protective coating;

Fig. 5 is a view similar to Fig. 4, but showing the spacing frame formed separately from the sheet of protective coating;

Fig. 6 shows a modification in which the sheet of protective coating is turned over the edges of the sheet of glass in order to give further protection;

Fig 6a shows a modification of the invention, in which the fluid cushion between the sheets of glass of the laminated structure is divided into a series of separate cells, while at the same time additional spacing members are provided between the sheets to insure a greater stability of the structure;

Fig. 7 is a plan view showing the mode of forming a larger laminated sheet than that shown in Fig. 4 by providing in addition to the spacing frame a central spacer;

Fig. 8 is a sectional view of Fig. 7;

Fig. 9 is a plan view partly in section showing a mode of reinforcing a laminated sheet of shatter-proof glass;

Fig. 10 is a sectional view of Fig. 9;

Fig. 11 is an enlarged detail of the section shown in Fig. 10;

Fig. 12 is an enlarged detail of the section shown in Fig. 10, but slightly modified to show the reinforcing means separated from the sheets of glass on either side by a slight thickness of the cellulose or other protective material, and Fig. 13 shows the reinforcing used in connection with the laminated glass of the general construction shown in Figs. 4 and 5.

In carrying out the invention, each sheet of glass which is to be used in making the laminated glass is preferably first coated with a layer or skin of some comparatively tough, non-brittle material, such as nitro-cellulose, which can readily be applied in a substantially uniform layer and which will adhere to the glass, a simple apparatus for this purpose being shown in Fig. 1, intended for applying celluloid, and comprising a series of laterally spaced flexible pipes 2 coming from a source 3 of celluloid solution to a series of spreading nozzles 4 controlled by a cock 8 to provide for the spreading of a layer of a coating of the desired thickness over the width of the sheet, the nozzle being vertically adjustable by means of a rack 8 and a pinion controlled by a hand-wheel 10. As the coating is applied, it preferably passes under a drying chamber 12, through which a current of air is circulated, which may be heated by electrical resistance 14, so that the solvent for the nitro-cellulose material is quickly evaporated. The air may enter through the intake pipe 15 and leave through the exhaust pipe 17. The glass 16 is shown as moved under the nozzle 14 by an endless conveyor 18 and the coating is shown at 20.

In order to form the laminated sheet of the present invention having an air or other fluid cushioning space between the two sheets of celluloid-coated glass, a narrow frame 22 is provided which is of such dimensions as to fit the margin of one of the sheets, this frame being either formed as a separate frame, as shown in Fig. 5, or moulded up from the celluloid or other coating as an integral part of it, as shown in Fig. 4. The other sheet of glass, having a plain coating, is then laid upon this frame with the coated side against the frame and we thus have formed a laminated sheet having between the coated faces an air or other fluid cushion 24 which is sealed within the sheet, the frame being preferably cemented to the coatings 20 of the two sheets of glass in any suitable manner, as, for example, by softening the material of the frame and the coatings sufficiently to cause them to form a substantially integral structure.

In the foregoing description, it will be seen that when a blow is received on one face of the laminated sheet of glass sufficiently strong to tend to shatter the glass, the glass will not splinter and fall to pieces like ordinary glass because of the coating 20 that locks the fragments or splinters against dropping out of the sheet. Furthermore, by reason of the air cushion 24, between the two sheets of glass that form the laminated sheet, this shock will not be directly transmitted to the other sheet of glass, the shock being distributed laterally by the air cushion, and thus the chances of the other sheet of glass being also fractured will be substantially reduced.

In the modified form of the invention shown in Fig. 7, there is provided in addition to the frame 22 a central button 26 of spacing material which may be of transparent cellulose material like the coating and the frame, this additional spacing member usually being desirable when a laminated sheet of comparatively large dimensions is formed.

In the modified form of the invention shown in Fig. 6a, the spacing frame 22 is shown as provided with cross pieces 23 of the same transparent material, which serve not only to insure added rigidity and stability to the structure, but also to divide the fluid cushion between the sheets of glass into a series of separate cells or cushions, thus localizing the cushioning effect for blows received within the area of any individual cell.

In the modification of the invention shown in Figs. 9 to 13 inclusive, wire netting reinforcing is provided, this reinforcing, preferably of non-corrosive material or provided with a coating of non-corrosive material, being embedded in the cellulose coating and not in the glass itself as is common practice. In the embodiment of the invention illustrated in detail in Fig. 10 and in enlarged detail in Fig. 11, the cellulose or other coating to prevent shattering of the glass is shown as being only of a thickness sufficient to contain the wire reinforcing 28 so that this reinforcing is substantially contiguous with the sheet of glass 16 on either side. In Fig. 12, the cellulose or other protective coating is shown as being of a thickness to space the wire reinforcing from the glass on either side of it. In Fig. 13, the wire reinforcing is shown as embedded in the protective coatings of sheets of glass spaced by a frame or frames 22, substantially in the manner shown in Figs. 4 and 5.

If desired, the protective coatings may be brought over the edges of the sheets of glass as shown at 30 in Fig. 6, this being sometimes desirable in order to help cushion the laminated glass in the frame in which it may be mounted. Moreover, by bringing the coating 20 over the edge of the glass, the sealing of the edges of the laminated sheet against leakage of the air or other fluid from the cushion is facilitated. Although we have referred to the cushion 24 between the sheets forming the laminated sheet as an air cushion, it is obvious that it might be filled with some other fluid.

Having thus described my invention, what I desire to secure by United States Letters Patent and claim is:

In apparatus for use in the manufacture of laminated glass, means for applying a coating of shatter-resisting material to glass comprising a drying chamber, means for circulating a current of air therethrough, means for heating said air, means for carrying the glass through said drying chamber, means associated with the drying chamber at the forward end thereof for flowing a layer of the shatter-resisting material upon the glass by gravity, a source of supply for the shatter-resisting material, a flexible pipe connecting the source of supply and the flowing means, and a rack and pinion adjustment for moving the said flowing means vertically relative to said drying chamber and source of supply.

JOHN C. HENDERSON.